(12) United States Patent (10) Patent No.: US 8,967,654 B1
Riibe (45) Date of Patent: Mar. 3, 2015

(54) TRAILER HITCH

(71) Applicant: Gary Riibe, Herman, NE (US)

(72) Inventor: Gary Riibe, Herman, NE (US)

( * ) Notice: Subject to any disclaimer, the term of this patent is extended or adjusted under 35 U.S.C. 154(b) by 0 days.

(21) Appl. No.: 14/160,743

(22) Filed: Jan. 22, 2014

Related U.S. Application Data

(63) Continuation-in-part of application No. 14/042,805, filed on Oct. 1, 2013.

(51) Int. Cl.
*B60D 1/28* (2006.01)
*B60D 1/06* (2006.01)

(52) U.S. Cl.
CPC ... *B60D 1/28* (2013.01); *B60D 1/06* (2013.01)
USPC .......................................... 280/507; 280/511

(58) Field of Classification Search
CPC .................................... B60D 1/28; B60D 1/58
USPC .................................. 280/507, 511, 457, 432
See application file for complete search history.

(56) References Cited

U.S. PATENT DOCUMENTS

| | | | |
|---|---|---|---|
| 1,805,642 A | 5/1931 | Strachan | |
| 1,926,264 A | 9/1933 | Connors | |
| 2,118,884 A | 5/1938 | Fuchs | |
| 2,564,520 A | 8/1951 | Blasdell | |
| 3,116,940 A | 1/1964 | Jinesa | |
| 3,181,887 A | 5/1965 | Boylan et al. | |
| 3,326,576 A * | 6/1967 | Kothmann | 280/515 |
| 3,328,741 A | 6/1967 | Brown | |
| 3,549,173 A * | 12/1970 | Stanfield | 280/457 |
| 3,724,875 A * | 4/1973 | Hillman | 280/457 |
| 3,770,298 A * | 11/1973 | Phillips | 280/457 |
| 3,782,759 A * | 1/1974 | Thune | 280/457 |
| 3,833,928 A | 9/1974 | Gavit et al. | |
| 4,774,823 A * | 10/1988 | Callison | 70/14 |
| 4,832,360 A | 5/1989 | Christian | |
| 5,434,552 A | 7/1995 | Ems | |
| 5,476,281 A * | 12/1995 | Worthington | 280/507 |
| 5,558,350 A | 9/1996 | Kimbrough et al. | |
| 5,584,495 A * | 12/1996 | Mason | 280/507 |
| 5,909,891 A | 6/1999 | Swart et al. | |
| 5,938,227 A | 8/1999 | Hills | |
| 5,947,504 A * | 9/1999 | Milazzo | 280/457 |
| 5,964,475 A | 10/1999 | Gentner et al. | |
| 6,102,424 A | 8/2000 | Cole et al. | |
| 6,199,891 B1 * | 3/2001 | Bell et al. | 280/507 |
| 6,222,443 B1 | 4/2001 | Beeson et al. | |
| 6,305,702 B1 | 10/2001 | Alford, II | |
| 6,382,657 B1 * | 5/2002 | Lynn et al. | 280/507 |
| 6,402,178 B1 | 6/2002 | Ifflaender | |
| 6,481,738 B1 | 11/2002 | Duncan et al. | |
| 6,644,071 B2 * | 11/2003 | Gilbertson et al. | 70/14 |
| 6,840,339 B1 | 1/2005 | Nedele et al. | |
| 6,971,883 B1 | 12/2005 | Ridge | |
| 7,334,809 B2 * | 2/2008 | Coy | 280/507 |
| 7,404,591 B2 | 7/2008 | Bender | |

(Continued)

*Primary Examiner* — Kevin Hurley
(74) *Attorney, Agent, or Firm* — Dennis L. Thomte; Thomte Patent Law Office LLC

(57) ABSTRACT

A trailer hitch is disclosed which eliminates the need for safety chains. The trailer hitch includes a locking device which is selectively pivotally secured to the tongue of a trailer or the hitch ball coupler assembly at the forward end of the tongue or to both the hitch ball coupler assembly and the tongue. The locking device is selectively movable between locked and unlocked positions. When the locking device is in its locked position, the locking device prevents the disconnection of the hitch ball coupler assembly from the hitch ball.

6 Claims, 5 Drawing Sheets

(56) References Cited

U.S. PATENT DOCUMENTS

| | | |
|---|---|---|
| 7,581,746 B2 | 9/2009 | Abate et al. |
| 8,066,298 B2 | 11/2011 | Alguera Gallego et al. |
| 8,308,181 B2 | 11/2012 | Riibe |
| 8,465,041 B2 | 6/2013 | Riibe |
| 2002/0050698 A1 | 5/2002 | Dippenaar |
| 2006/0186639 A1* | 8/2006 | Rosario .......................... 280/507 |
| 2007/0176394 A1 | 8/2007 | Gehring et al. |

* cited by examiner

TRAILER HITCH

CROSS REFERENCE TO RELATED APPLICATION

This is a Continuation-In-Part of application Ser. No. 14/042,805 filed Oct. 1, 2013, entitled TRAILER HITCH.

BACKGROUND OF THE INVENTION

1. Field of the Invention

This invention relates to a trailer hitch and more particularly to a trailer hitch which eliminates the need for safety chains.

2. Description of the Related Art

Because of the danger of trailers becoming detached from the pulling vehicle, some state governments require auxiliary safety attachments when a trailer is being pulled. A customary safety device usually involves a pair of safety chains which extend between the trailer tongue or coupling assembly to the hitch or frame of the pulling vehicle. The connection of the safety chains may be awkward and difficult. Further, the safety chains sometimes become disconnected. Additionally, the safety chains drag on the roadway. The invention disclosed in the co-pending patent application represents a vast improvement in the trailer hitch art. The instant invention represents a further improvement in the trailer hitch art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer hitch is disclosed for connecting a trailer to the hitch drawbar of a pulling vehicle such as a truck, pickup, tractor, etc. The hitch drawbar has a rearward end and an upper surface. A hitch ball is secured to the rearward end of the drawbar. The hitch ball includes a threaded shank which extends downwardly through an opening formed in the drawbar. A lock washer embraces the threaded shank of the hitch ball below the drawbar and a nut is threadably mounted on the threaded shank of the hitch ball to secure the hitch ball to the drawbar.

A hitch ball coupler assembly is secured to the forwardly extending tongue of the trailer. The hitch ball coupler assembly includes a socket portion having an interior socket for receiving the ball of the hitch ball therein. A conventional locking device locks the socket portion to the ball of the hitch ball. A safety locking device, having a forward end and a rearward end, is pivotally secured to the tongue of the trailer and is selectively movable between locked and unlocked positions. In the locked position, the forward end of the safety locking device is positioned below the lower end of the shank of hitch ball and the rearward end of the safety locking device is pinned or otherwise locked to the tongue of the trailer to maintain the safety locking device in the locked position. The safety locking device, when in the locked position, prevents the socket portion of the hitch ball coupler assembly from moving upwardly with respect to the hitch ball thereby preventing the disconnection of the trailer from the hitch ball.

It is therefore a principal object of the invention to provide an improved trailer hitch.

A further object of the invention is to provide a trailer hitch which eliminates the need for safety chains.

A further object of the invention is to provide a trailer hitch including a safety locking assembly which prevents the separation of the trailer from the drawbar.

A further object of the invention is to provide a trailer hitch of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
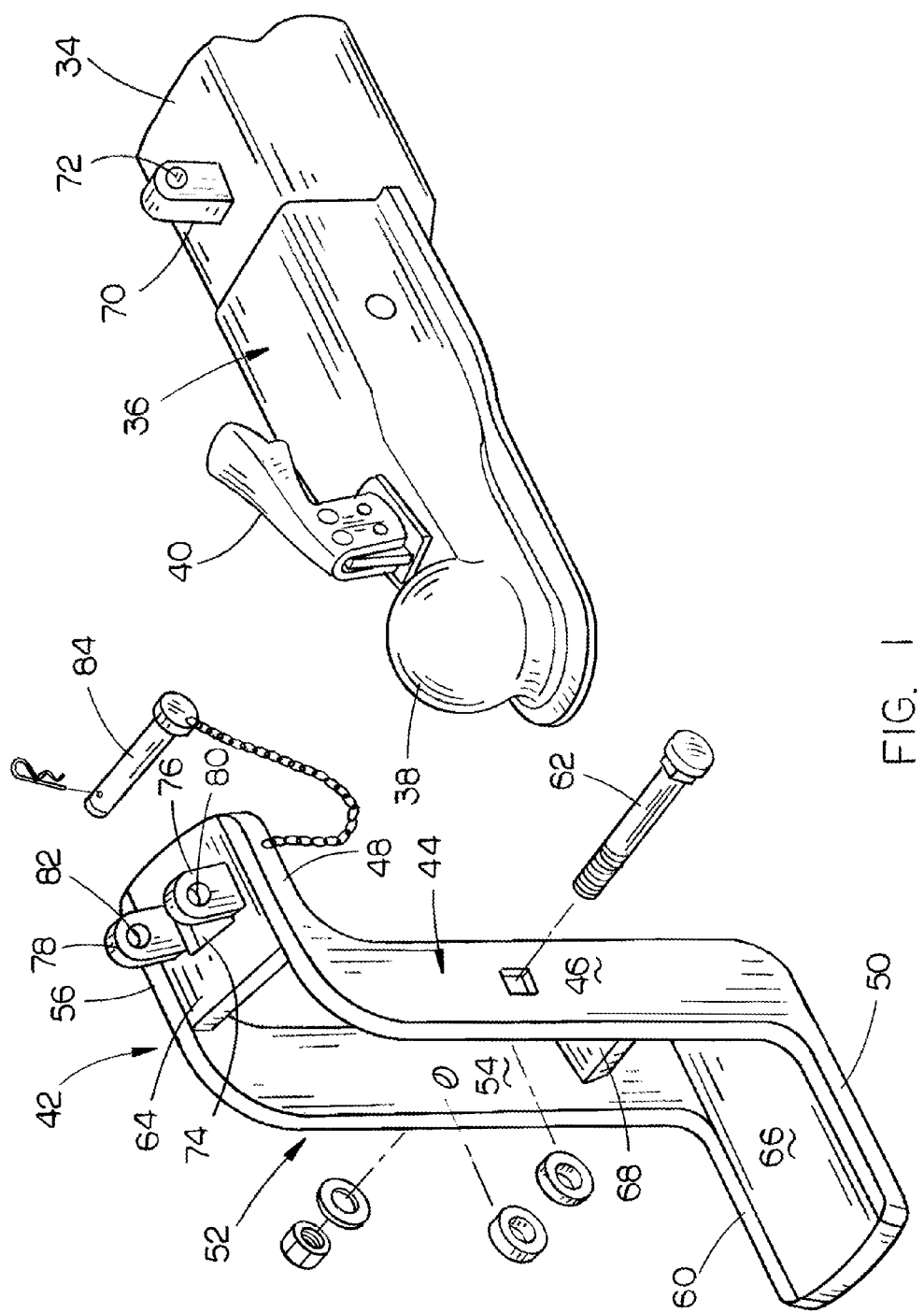
FIG. 1 is an exploded perspective view of the trailer hitch of this invention.
Figure 2:
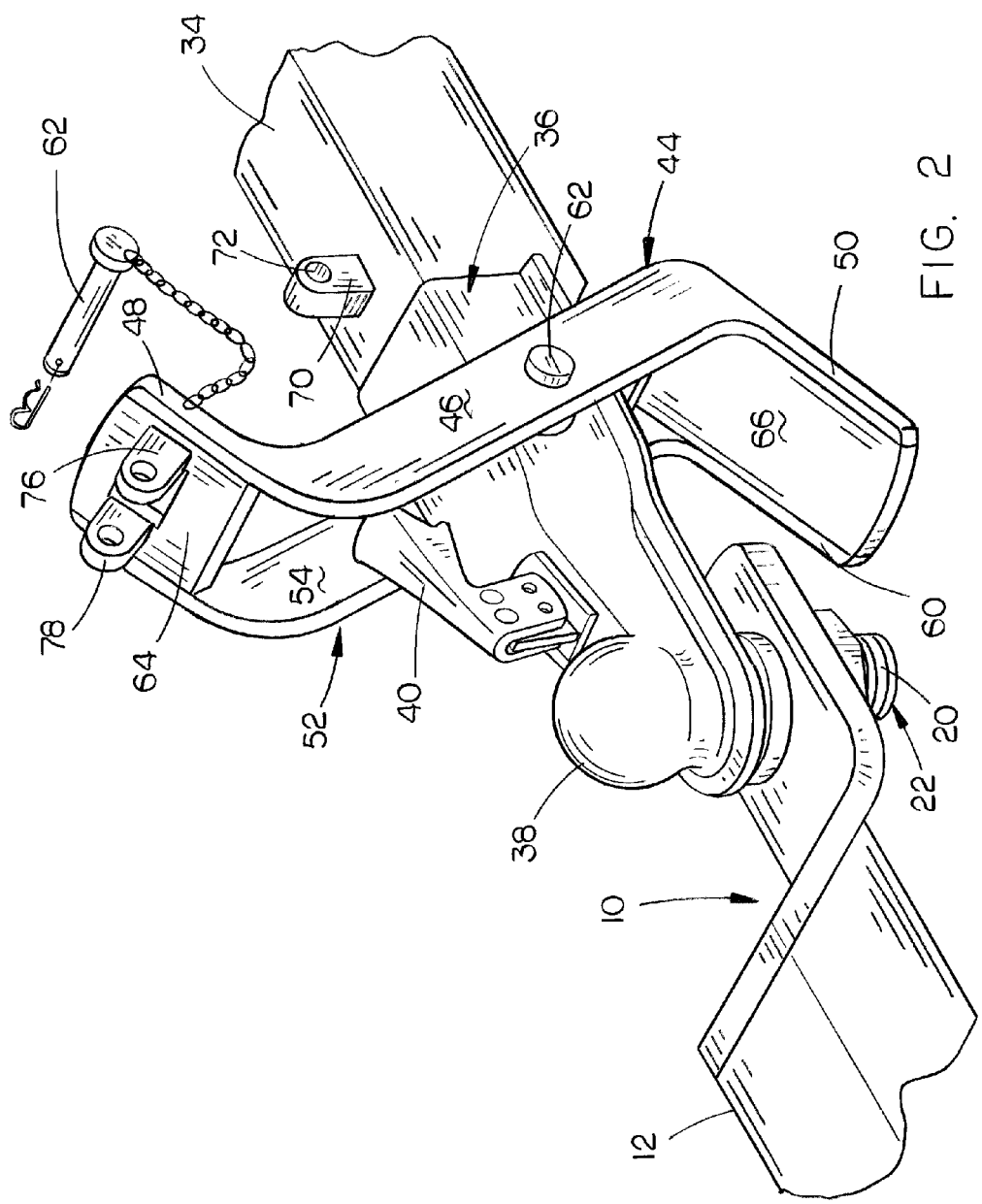
FIG. 2 is a perspective view illustrating the safety locking device of this invention in its unlocked position.
Figure 3:
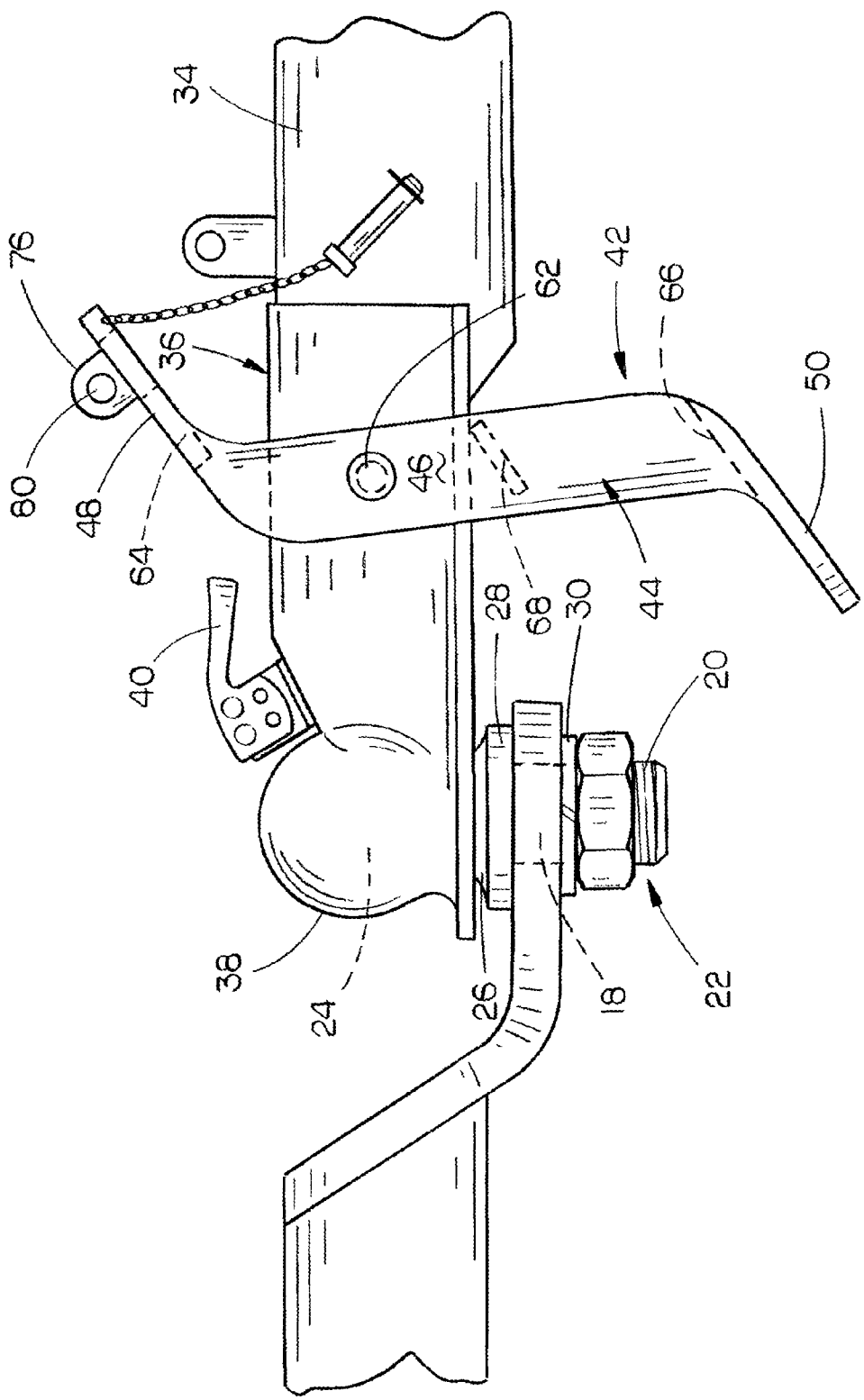
FIG. 3 is a side elevational view illustrating the safety locking device of this invention in its unlocked position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a hitch drawbar which may be fixed to the frame of the rearward end of a towing vehicle or which may be secured to the rearward end of a tube 12 which is selectively received in a conventional receiver which is secured to the frame of the towing vehicle. For purposes of description, drawbar 10 will be described as having a rearward end 14, and an upper surface 16. Drawbar 10 has an opening 18 formed therein adapted to receive the externally threaded shank 20 of a hitch ball 22 including a ball portion 24, neck 26 and base portion plate 28. Threaded shank 20 is received in opening 18 and is retained therein by a lock washer 30 and nut 32 in conventional fashion. To this point, the drawbar 10 and hitch ball 22 are conventional in design.

The numeral 34 refers to a tongue which extends forwardly from a trailer in conventional fashion. The numeral 36 refers to a coupler assembly which is secured to the forward end of tongue 34 and which extends forwardly therefrom. Coupler assembly 36 is conventional in design and includes a hitch ball socket 38 and a locking device 40. To this point the coupler assembly 36 is conventional in design.

The safety locking device of this invention is referred to by the reference numeral 42. Device 42 is elongated and box-like or channel shaped as will now be described. Device 42 includes a vertically disposed first side wall member 44 having a central portion 46, a rearwardly extending upper end portion 48 and a forwardly extending lower end portion 50. Device 42 also includes a vertically disposed second side wall member 52 which is horizontally spaced from side wall member 44. Side wall member 52 includes a central portion 54, a rearwardly extending upper end portion 56 and a forwardly extending lower end portion 60. As seen, side wall members 44 and 52 are positioned on opposite sides of the trailer tongue 34 and coupler assembly 36. Side wall members 44 and 52 are pivotally secured to coupler assembly 36, about a horizontal axis, by pin or bolt 62 as seen in FIG. 1. Although the drawings illustrate that the pin 62 extends through the coupler assembly 36, pin 62 could extend through tongue 34 rearwardly of the rearward end of coupler assembly 36. Further, if the forward end of tongue 34 extends considerably forwardly in coupler assembly 36, pin 62 could extend through coupler assembly 36 and the forward end of tongue 34.

Figure 4:
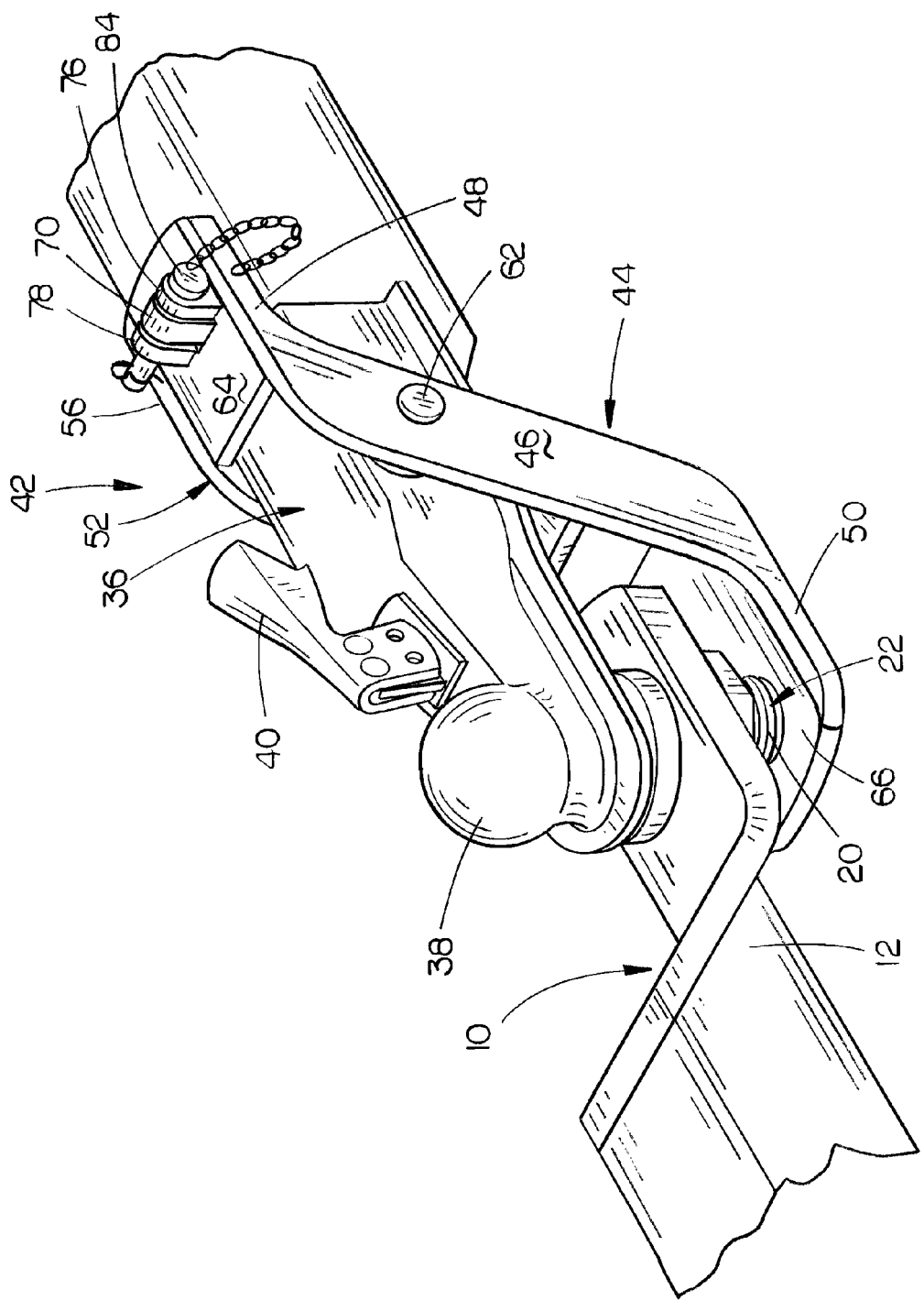
FIG. 4 is a perspective view illustrating the safety locking device of this invention in its locked position.
Figure 5:
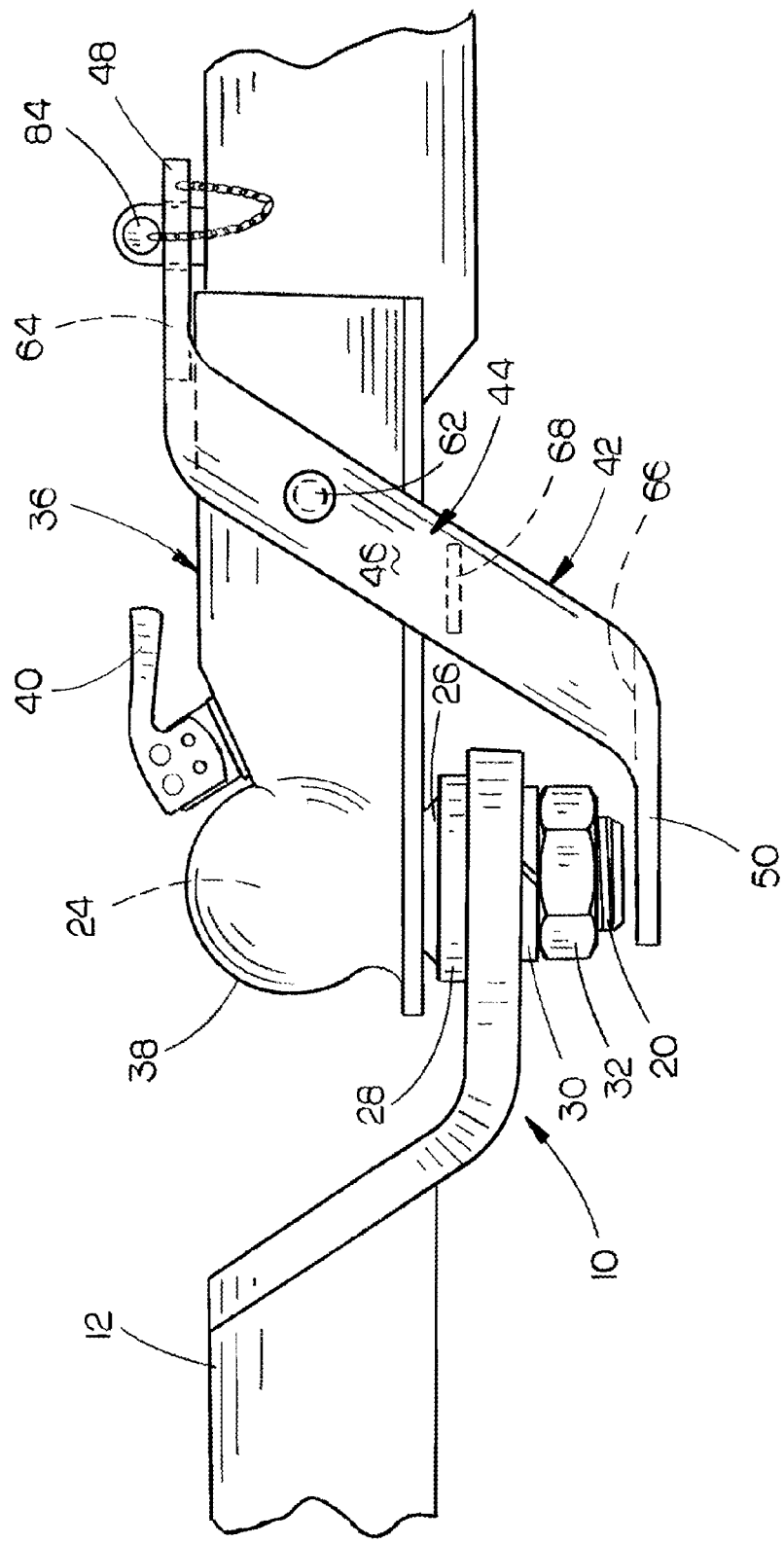
FIG. 5 is a side elevational view illustrating the safety locking device of this invention in its locked position.

Device 42 also includes an upper or top wall member 64 which is secured to the rearwardly extending upper end wall portions 48 and 56 of side wall members 44 and 52 respectively and which extends therebetween over the upper end of tongue 34 and coupler assembly 36. Device 42 further includes a lower or bottom wall member 66 which is secured to the forwardly extending lower end portions 50 and 58 of side wall members 44 and 52 respectively and which extends therebetween below the lower end of tongue 34 and coupler assembly 36. Side wall members 44 and 52 and the wall members 64 and 66 could be of one-piece construction if so desired. A stop plate 68 is secured to the inner sides of side wall members 44 and 52 and extends therebetween below tongue 34 and coupler assembly 36. Tongue 34 has an ear or bracket 70 secured thereto which extends upwardly therefrom. Bracket 70 has a pin opening 72 formed therein. Although bracket 70 is shown in the drawings as being secured to tongue 34, bracket 70 could be secured to the rearward end of coupler assembly 36 if so desired. The top wall member 64 of locking device 42 has a slot or opening 74 formed therein which is configured to receive the bracket 70 therein respectively when the locking device 42 is in the locked position. Top wall member 64 has a pair of spaced brackets or ears 76 and 78 secured thereto which extend upwardly therefrom. Brackets 76 and 78 have pin openings 80 and 82 formed therein respectively. When locking device 42 is in the locked position, a pin 84 is extended through the brackets 76, 70 and 78 to maintain the locking device 42 in the locked position. When the locking device 42 is in the locked position of FIGS. 4 and 5, bottom wall 66 will be closely positioned below the lower end of the threaded shank 20 of the hitch ball 22 to prevent the coupler assembly 36 from moving sufficiently upwardly with respect to the hitch ball 24 which would otherwise cause the disconnection of the coupling device 36 from the hitch ball 24.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with a towing vehicle having a rearwardly extending hitch drawbar, having a rearward end, an upper surface, a lower surface, and a hitch ball secured to the rearward end of the drawbar, with the hitch ball including a threaded shank, having a lower end, which extends downwardly through an opening formed in the drawbar, comprising:
   a trailer including a forwardly extending tongue having a forward end, a first side, a second side, an upper end and a lower end;
   a hitch ball coupler assembly secured to said forward end of said tongue which includes a socket portion having an interior socket for selectively receiving the hitch ball therein;
   a locking means movably associated with said socket portion to lock said socket portion to the hitch ball;
   a safety locking device pivotally secured to said hitch ball coupler assembly, about a horizontal axis, which is selectively movable between locked and unlocked positions with respect to said hitch ball coupler assembly and said tongue;
   said safety locking device, when in said locked position, having a portion thereof positioned closely below the lower end of the shank of the hitch ball to limit the upward movement of said socket portion of said hitch ball coupler assembly with respect to the hitch ball to prevent the disconnection of said hitch ball coupler assembly from the hitch ball;
   said safety locking device comprising: a first vertically disposed side wall member having a central portion, a rearwardly extending upper end portion, and a forwardly extending lower end portion, said first side wall member being positioned outwardly of said first side of said tongue, a second vertically disposed second side wall member having a central portion, a rearwardly extending upper end portion, and a forwardly extending lower end portion, said second side wall member being positioned outwardly of said second side of said tongue, said central portions of said first and second side wall members being pivotally secured, about a horizontal axis, to said hitch ball coupler assembly rearwardly of said socket portion, a top wall secured to and extending between said rearwardly extending upper portions of said first and second side wall members above said tongue, a bottom wall secured to and extending between said forwardly extending lower end portions of said first and second side wall members below said hitch ball coupler assembly, said safety locking device being selectively pivotally movable between locked and unlocked positions, said bottom wall of said safety locking device being positioned closely below the lower end of the shank of the hitch ball when said safety locking device is in said locked position, and a locking mechanism for locking said safety locking device in said locked position.

2. The combination of claim 1 wherein said locking mechanism selectively locks said top wall of said safety locking device to said tongue.

3. In combination with a towing vehicle having a rearwardly extending hitch drawbar, having a rearward end, an upper surface, a lower surface, and a hitch ball secured to the rearward end of the drawbar, with the hitch ball including a threaded shank, having a lower end, which extends downwardly through an opening formed in the drawbar, comprising:
   a trailer including a forwardly extending tongue having a forward end, a first side and a second side;
   a hitch ball coupler assembly secured to said forward end of said tongue which includes a socket portion having an interior socket for selectively receiving the hitch ball therein;

a locking means movably associated with said socket portion to lock said socket portion to the hitch ball;

a safety locking device pivotally secured to said hitch ball coupler assembly, about a horizontal axis, which is selectively movable between locked and unlocked positions with respect to said hitch ball coupler assembly and said tongue;

said safety locking device, when in said locked position, having a portion thereof positioned closely below the lower end of the shank of the hitch ball to limit the upward movement of said socket portion of said hitch ball coupler assembly with respect to the hitch ball to prevent the disconnection of said hitch ball coupler assembly from the hitch ball;

said hitch ball coupler assembly having an upper end, a lower end, a first side and a second side;

said safety locking device comprising: a first vertically disposed side wall member having a central portion, an upper end portion and a lower end portion, said first side wall member being positioned outwardly of said first side of said hitch ball coupler assembly, a second vertically disposed second side wall member having a central portion, an upper end portion, and a lower end portion, said second side wall member being positioned outwardly of said second side of said hitch ball coupler assembly, said central portions of said first and second side wall members being pivotally secured, about a horizontal axis, to said hitch ball coupler assembly rearwardly of said socket portion, a top wall secured to and extending between said upper portions of said first and second side wall members above said hitch ball coupler assembly, a bottom wall secured to and extending between said lower end portions of said first and second side wall members below said hitch ball coupler assembly, said safety locking device being selectively pivotally movable between locked and unlocked positions, said bottom wall of said safety locking device being positioned closely below the lower end of the shank of the hitch ball when said safety locking device is in said locked position, and a locking mechanism for locking said safety locking device in said locked position.

4. The combination of claim 3 wherein said locking mechanism selectively locks said top wall of said safety locking device to said tongue.

5. The combination of claim 3 wherein said locking mechanism selectively locks said top wall of said safety locking device to said hitch ball coupler assembly.

6. The combination of claim 3 wherein said first and second side wall members are pivotally secured to said tongue rather than said hitch ball coupler assembly.

* * * * *